United States Patent
Lee et al.

(10) Patent No.: US 10,647,316 B2
(45) Date of Patent: May 12, 2020

(54) APPARATUS AND METHOD FOR DECIDING A MANEUVER OF A NEARBY VEHICLE

(71) Applicants: HYUNDAI MOTOR COMPANY, Seoul (KR); KIA MOTORS CORPORATION, Seoul (KR); AJOU UNIVERSITY INDUSTRY-ACADEMIC COOPERATION FOUNDATION, Suwon-si, Gyeonggi-do (KR)

(72) Inventors: Hoon Lee, Gunpo-si (KR); Hyung Sun Jang, Anyang-si (KR); Uk Il Yang, Yongin-si (KR); Ji Eun Won, Hwaseong-si (KR); Seul Ki Han, Seoul (KR); Bo Young Yun, Hwaseong-si (KR); Bong Sob Song, Seongnam-si (KR); Sung Woo Lee, Ulsan (KR); Sang Won Lee, Yongin-si (KR)

(73) Assignees: HYUNDAI MOTOR COMPANY, Seoul (KR); KIA MOTORS CORPORATION, Seoul (KR); AJOU UNIVERSITY INDUSTRY-ACADEMIC COOPERATION FOUNDATION, Suwon-si (KR)

(*) Notice: Subject to any disclaimer, the term of this patent is extended or adjusted under 35 U.S.C. 154(b) by 96 days.

(21) Appl. No.: 15/971,500

(22) Filed: May 4, 2018

(65) Prior Publication Data
US 2019/0184987 A1 Jun. 20, 2019

(30) Foreign Application Priority Data
Dec. 19, 2017 (KR) .......................... 10-2017-0175362

(51) Int. Cl.
*B60W 30/095* (2012.01)
*B60W 40/09* (2012.01)
(Continued)

(52) U.S. Cl.
CPC ........ *B60W 30/0956* (2013.01); *B60W 40/09* (2013.01); *G01S 13/726* (2013.01);
(Continued)

(58) Field of Classification Search
CPC ............. B60W 30/0956; B60W 40/09; B60W 2422/95; B60W 2550/306;
(Continued)

(56) References Cited

U.S. PATENT DOCUMENTS

| | | | |
|---|---|---|---|
| 9,523,984 B1* | 12/2016 | Herbach | ............... B62D 15/025 |
| 2007/0150196 A1* | 6/2007 | Grimm | ..................... B60T 7/22 |
| | | | 701/301 |
| 2010/0152951 A1* | 6/2010 | Chin | ..................... B60W 40/09 |
| | | | 701/31.4 |

FOREIGN PATENT DOCUMENTS

| | | |
|---|---|---|
| KR | 20130078382 | 7/2013 |
| KR | 20130089351 | 8/2013 |

(Continued)

OTHER PUBLICATIONS

Predicted Potential Risk-based Vehicle Motion Control of Automated Vehicles for Integrated Risk Management, Seoul National University; The Graduate School; School of Mechanical and Aerospace Engineering; Kim, Kyuwon; Feb. 2016; 125 pages.
(Continued)

*Primary Examiner* — Muhammad Shafi
(74) *Attorney, Agent, or Firm* — Lempia Summerfield Katz LLC

(57) ABSTRACT

An apparatus and a method are capable of accurately deciding a maneuver of a surrounding vehicle. The apparatus
(Continued)

includes a first surrounding vehicle information detector configured to obtain first surrounding vehicle information for a surrounding vehicle of a vehicle by using a front radar device. The apparatus further includes a second surrounding vehicle information detector configured to obtain second surrounding vehicle information for the surrounding vehicle by using a corner radar device. The apparatus also includes a processor configured to decide a motion of the surrounding vehicle by using the first surrounding vehicle information and the second surrounding vehicle information. The processor is also configured to decide a maneuver of the surrounding vehicle by using maneuver decision logic derived by a mechanical training technique. The processor is further configured to decide a final maneuver of the surrounding vehicle by using the two decision results.

20 Claims, 12 Drawing Sheets

(51) Int. Cl.
*G01S 13/931* (2020.01)
*G06N 20/00* (2019.01)
*G01S 13/72* (2006.01)
*G01S 15/931* (2020.01)
*G01S 17/931* (2020.01)

(52) U.S. Cl.
CPC ............ *G01S 13/931* (2013.01); *G06N 20/00* (2019.01); *B60W 2420/52* (2013.01); *B60W 2422/95* (2013.01); *B60W 2554/4041* (2020.02); *B60W 2554/803* (2020.02); *B60W 2554/804* (2020.02); *G01S 15/931* (2013.01); *G01S 17/931* (2020.01); *G01S 2013/932* (2020.01); *G01S 2013/93271* (2020.01)

(58) Field of Classification Search
CPC ....... B60W 2550/304; B60W 2420/52; B60W 2550/302; G06N 20/00; G01S 13/87; G01S 2013/9385; G01S 13/726; G01S 13/931; G01S 15/931; G01S 2013/9353; G01S 17/936; G01S 2013/9375
USPC .......................................................... 701/301
See application file for complete search history.

(56) References Cited

FOREIGN PATENT DOCUMENTS

| KR | 10-20140118157 A | * | 10/2014 |
| KR | 20150055656 | | 5/2015 |
| KR | 20160071164 | | 6/2016 |

OTHER PUBLICATIONS

Ristic, Branko et al., Beyond the Kalman Filter, IEEE Aerospace and Electronic Systems Magazine 19.7; 2004; 2 pp.

* cited by examiner

APPARATUS AND METHOD FOR DECIDING A MANEUVER OF A NEARBY VEHICLE

CROSS-REFERENCE TO RELATED APPLICATION

This application is based on and claims the benefit of priority to Korean Patent Application No. 10-2017-0175362, filed on Dec. 19, 2017, in the Korean Intellectual Property Office, the disclosure of which is incorporated herein in its entirety by reference.

TECHNICAL FIELD

The present disclosure relates to an apparatus and a method for deciding a maneuver of a surrounding or nearby vehicle, by which a maneuver of the surrounding or nearby vehicle may be accurately decided.

BACKGROUND

In recent years, technologies have been studied or developed for recognizing surrounding situations of a vehicle by using sensors mounted in the vehicle to assist driving of a vehicle by the driver. Among them, technologies for deciding a maneuver of a lateral or front vehicle by using a front/rear corner radar device and a front radar device mounted in a vehicle have been introduced. Throughout the present disclosure, terms such as "surrounding", "nearby", "close", "neighboring", and the like mean vehicles in relatively close proximity to a reference vehicle, host vehicle, or the like.

According to the conventional technology for deciding the maneuver of a vehicle, when a neighboring lateral or front vehicle cuts in in a low speed situation, a host vehicle may wrongly decide a maneuver of the surrounding or neighboring vehicle. The wrong decision may be caused by the radar device of the host vehicle providing the wrong information. Alternatively, the wrong decision may be due to an error of decision when the state of the surrounding vehicle is determined.

SUMMARY

The present disclosure is directed to solving the above-described problems of the related art. The present disclosure provides an apparatus and a method for deciding a maneuver of a surrounding vehicle. The maneuver for cut-in of the surrounding vehicle may be decided by synthesizing or combining an existing maneuver deciding algorithm and an existing threat deciding algorithm by using a machine training technique.

The present disclosure also provides an apparatus and a method for deciding a maneuver of a surrounding vehicle. A maneuver decision performance may be improved by using a sensor fusion information and a maneuver deciding algorithm as well as the surrounding vehicle information detected by multiple sensors.

The technical objects of the present disclosure are not limited to the above-mentioned ones. Other unmentioned technical objects will become apparent to those of ordinary skill in the art from the following description.

In accordance with an aspect of the present disclosure, an apparatus for deciding a maneuver of a surrounding vehicle includes a first surrounding vehicle information detector configured to obtain first surrounding vehicle information for a surrounding vehicle of a vehicle by using a front radar device. The apparatus also includes a second surrounding vehicle information detector configured to obtain second surrounding vehicle information for the surrounding vehicle by using a corner radar device. The apparatus further includes a processor configured to decide a motion of the surrounding vehicle by using the first surrounding vehicle information and the second surrounding vehicle information. The processor is also configured to decide a maneuver of the surrounding vehicle by using maneuver decision logic derived by a mechanical training technique. The processor is further configured to decide a final maneuver of the surrounding vehicle by using the two decision results.

A support vector machine (SVM) may be used for the machine training technique.

The processor may identify whether the surrounding vehicle detected by the front radar device and the surrounding vehicle detected by the corner radar device are the same vehicle by using the first surrounding vehicle information and the second surrounding vehicle information.

The processor may fuse the first surrounding vehicle information and the second surrounding vehicle information when the surrounding vehicle detected by the front radar device and the surrounding vehicle detected by the corner radar device are the same vehicle.

The processor may decide that a current maneuver of the surrounding vehicle is a cut-in when a motion of the surrounding vehicle is dynamic, a previous maneuver of the surrounding vehicle is not a cut-in, and a decision result by the maneuver decision logic satisfies a reference condition.

The processor may decide that a current maneuver of the surrounding vehicle is driving when a motion of the surrounding vehicle is dynamic, a previous maneuver of the surrounding vehicle is not a cut-in, and a decision result by the maneuver decision logic fails to satisfy a reference condition.

The processor may decide that a current maneuver of the surrounding vehicle is a cut-in when a motion of the surrounding vehicle is stationary and a previous maneuver of the surrounding vehicle is a cut-in.

The processor may decide that a current maneuver of the surrounding vehicle is a stop when a motion of the surrounding vehicle is stationary and a previous maneuver of the surrounding vehicle is not a cut-in.

The processor may decide that a current maneuver of the surrounding vehicle is a cut-in when a motion of the surrounding vehicle is dynamic, a previous maneuver of the surrounding vehicle is a cut-in, and a distance between the vehicle and the surrounding vehicle is less than a reference value.

The processor may decide that a current maneuver of the surrounding vehicle is driving when a motion of the surrounding vehicle is dynamic, a previous maneuver of the surrounding vehicle is a cut-in, and a distance between the vehicle and the surrounding vehicle is more than a reference value.

In accordance with another aspect of the present disclosure, a method for deciding a maneuver of a surrounding vehicle includes obtaining a surrounding vehicle information for a surrounding vehicle of a vehicle by using a front radar device and a corner radar device. The method also includes deciding a maneuver of the surrounding vehicle according to a maneuver decision logic derived by a machine training technique by using the surrounding vehicle information. The method further includes deciding a motion of the surrounding vehicle by using the surrounding vehicle information. The method also includes deciding a final maneuver of the surrounding vehicle based on a motion decision result of the surrounding vehicle and a maneuver decision result by the maneuver decision logic.

The obtaining of the surrounding vehicle information may include identifying whether the surrounding vehicle detected by the front radar device and the surrounding vehicle detected by the corner radar device are the same vehicle by using the first surrounding vehicle information and the second surrounding vehicle information.

The obtaining of the surrounding vehicle information may include generating the surrounding vehicle information by fusing the first surrounding vehicle information and the second surrounding vehicle information when the surrounding vehicle detected by the front radar device and the surrounding vehicle detected by the corner radar device are the same vehicle.

A support vector machine (SVM) may be used for the machine training technique.

The deciding of the final maneuver of the surrounding vehicle may include deciding that a current maneuver of the surrounding vehicle is a cut-in when a motion of the surrounding vehicle is dynamic, a previous maneuver of the surrounding vehicle is not a cut-in, and a decision result by the maneuver decision logic satisfies a reference condition.

The deciding of the final maneuver of the surrounding vehicle may include deciding that a current maneuver of the surrounding vehicle is driving when a motion of the surrounding vehicle is dynamic, a previous maneuver of the surrounding vehicle is not a cut-in, and a decision result by the maneuver decision logic fails to satisfy a reference condition.

The deciding of the final maneuver of the surrounding vehicle may include deciding that a current maneuver of the surrounding vehicle is a cut-in when a motion of the surrounding vehicle is stationary and a previous maneuver of the surrounding vehicle is a cut-in.

The deciding of the final maneuver of the surrounding vehicle may include deciding that a current maneuver of the surrounding vehicle is a stop when a motion of the surrounding vehicle is stationary and a previous maneuver of the surrounding vehicle is not a cut-in.

The deciding of the final maneuver of the surrounding vehicle may include deciding that a current maneuver of the surrounding vehicle is a cut-in when a motion of the surrounding vehicle is dynamic, a previous maneuver of the surrounding vehicle is a cut-in, and a distance between the vehicle and the surrounding vehicle is less than a reference value.

The deciding of the final maneuver of the surrounding vehicle may include deciding that a current maneuver of the surrounding vehicle is driving when a motion of the surrounding vehicle is dynamic, a previous maneuver of the surrounding vehicle is a cut-in, and a distance between the vehicle and the surrounding vehicle is more than a reference value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
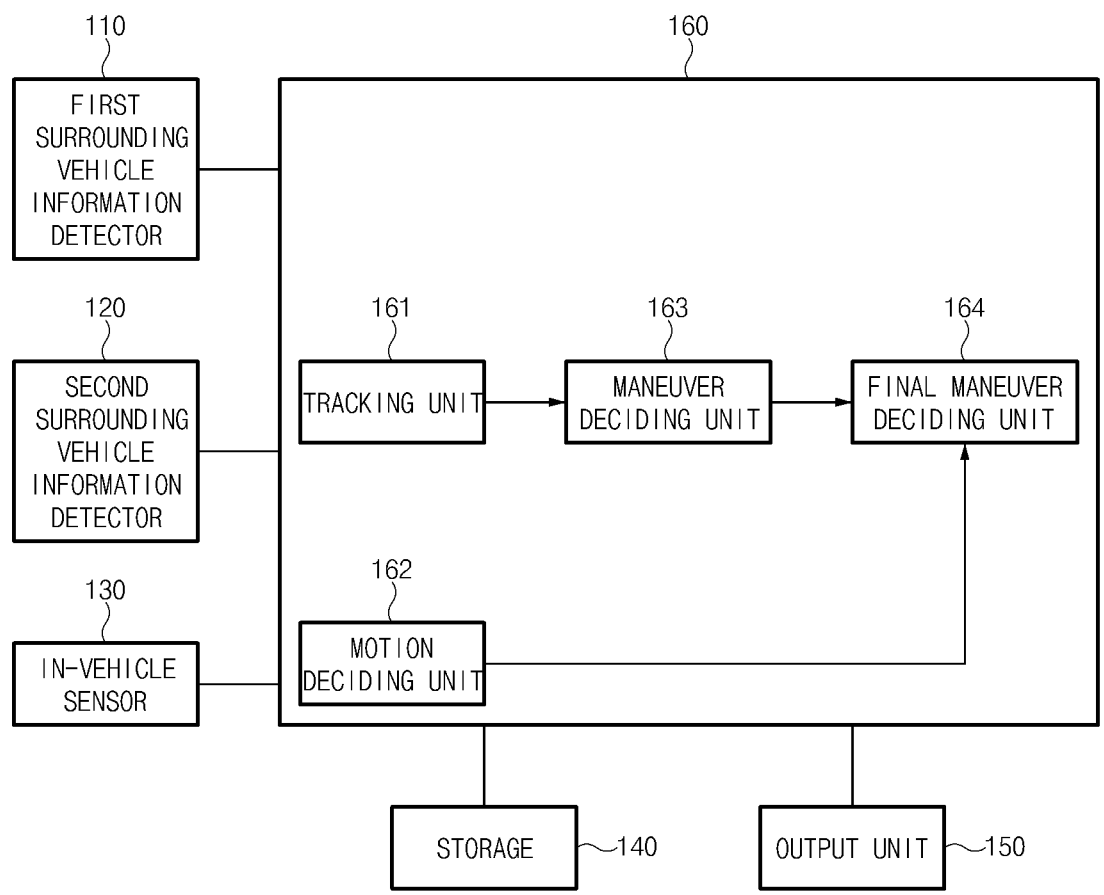
FIG. 1 is a block diagram of a surrounding vehicle maneuver deciding apparatus according to an embodiment of the present disclosure.
Figure 2:
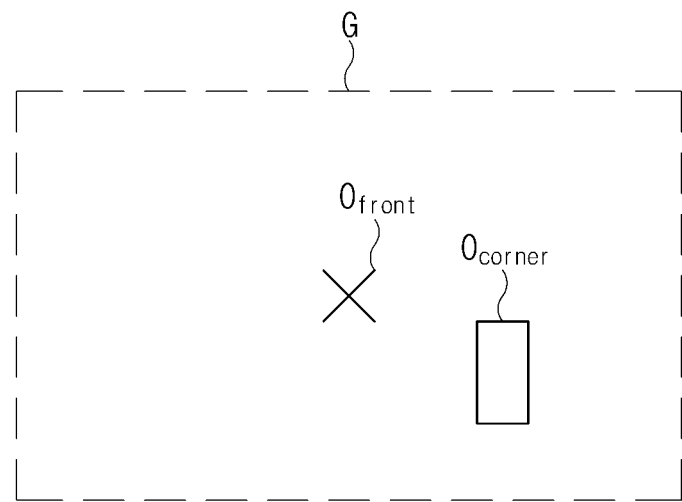
FIG. 2 is a view explaining a method for deciding the passing of a gate related to the present disclosure.
Figure 3:
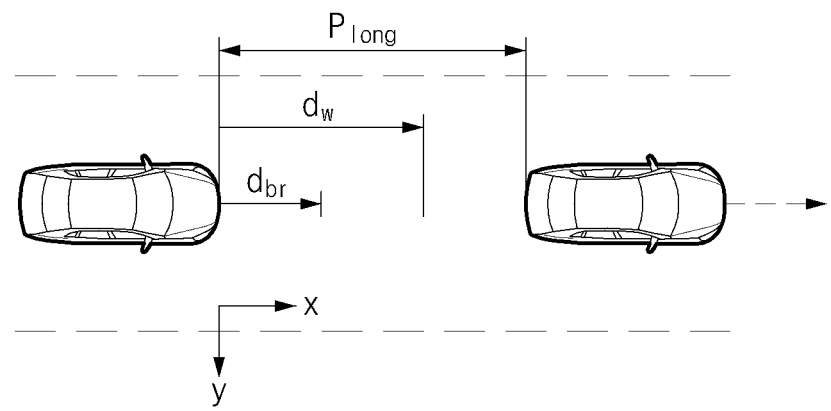
FIG. 3 is a view explaining a warning index calculating method related to the present disclosure.
Figure 4A:
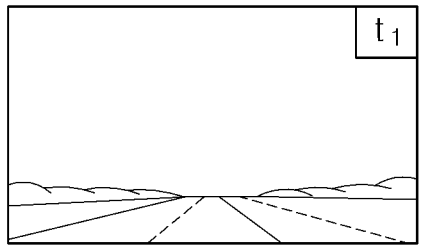
FIG. 4A is a graph depicting a collision threat index in a cut-in situation related to the present disclosure.
Figure 4A:
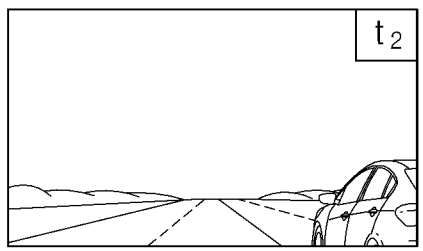
Figure 4A:
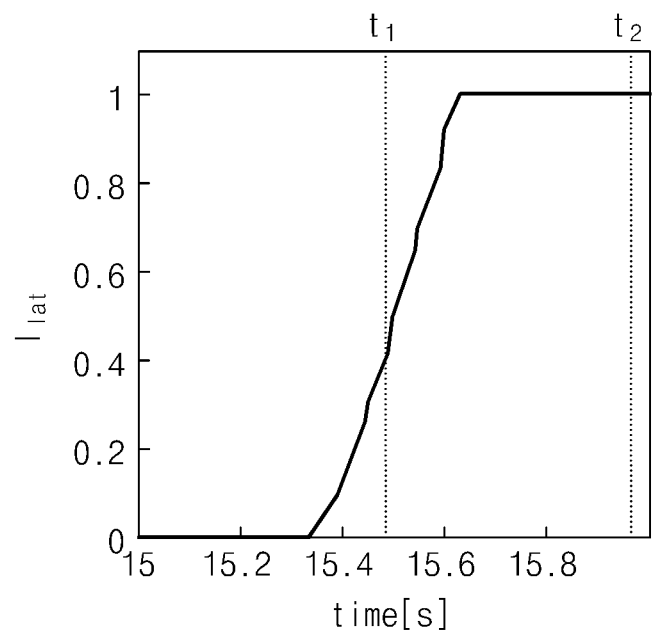
Figure 4B:
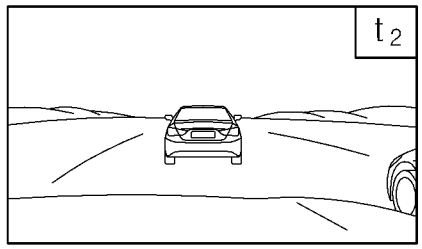
FIG. 4B is a graph depicting a collision threat index in a driving situation related to the present disclosure.
Figure 4B:
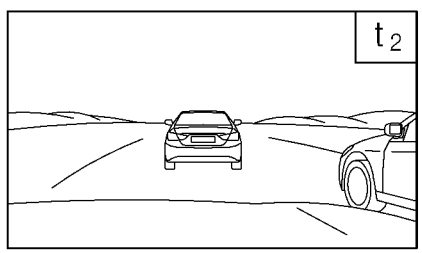
Figure 4B:
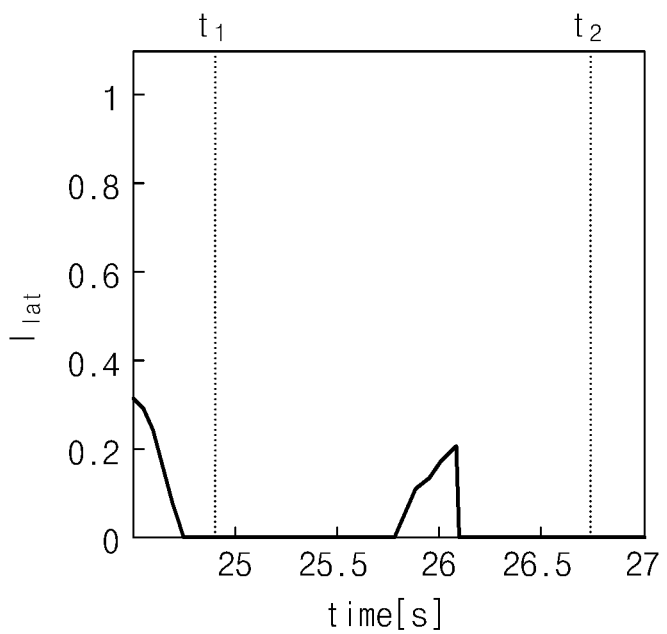
Figure 5:
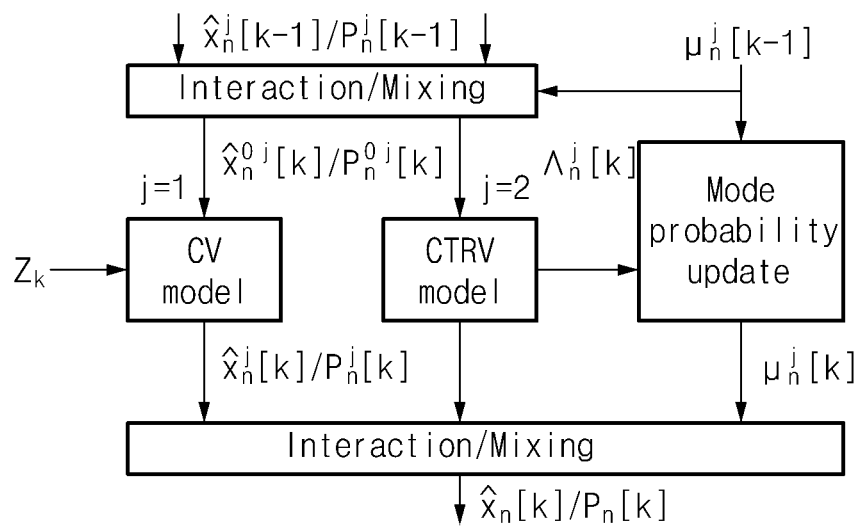
FIG. 5 is a view illustrating an Interacting Multiple Model Unscented Kalman Filter (IMM-UKF) related to the present disclosure.
Figure 7:
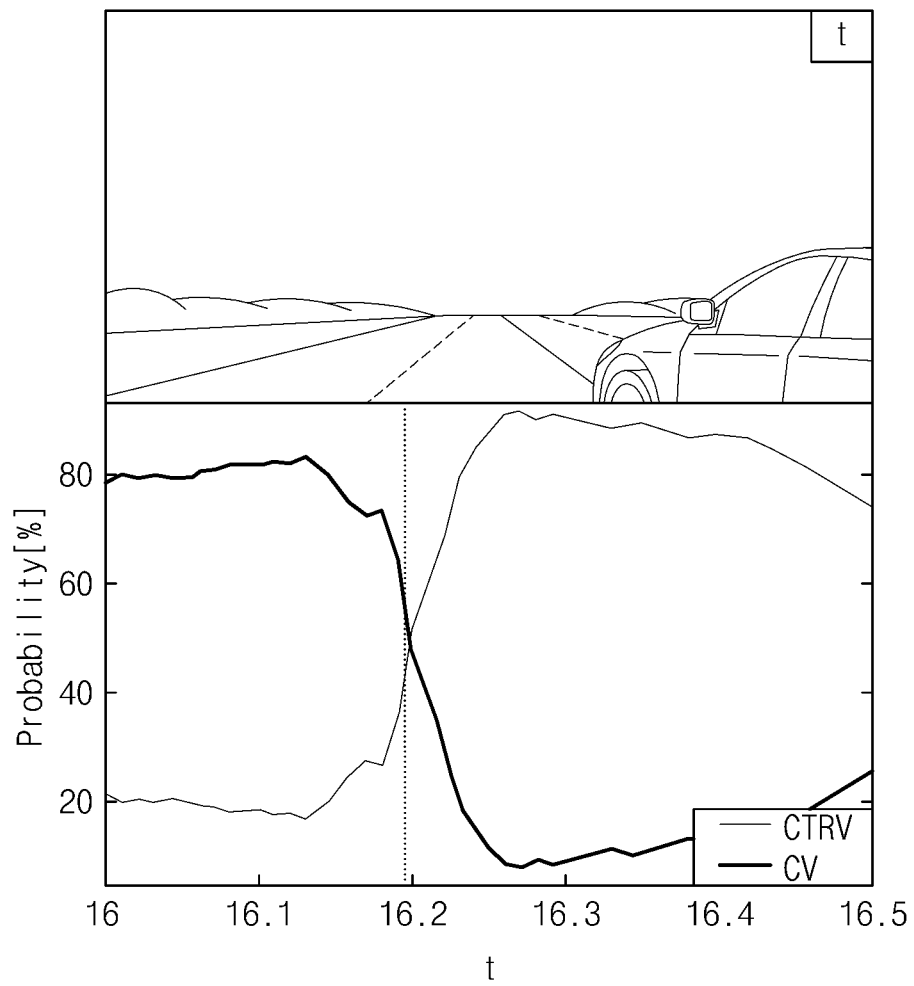
FIG. 7 is a graph depicting changes of probabilities of a constant velocity (CV) model and a constant turn rate and velocity (CTRV) model in a cut-in situation related to the present disclosure.
Figure 8A:
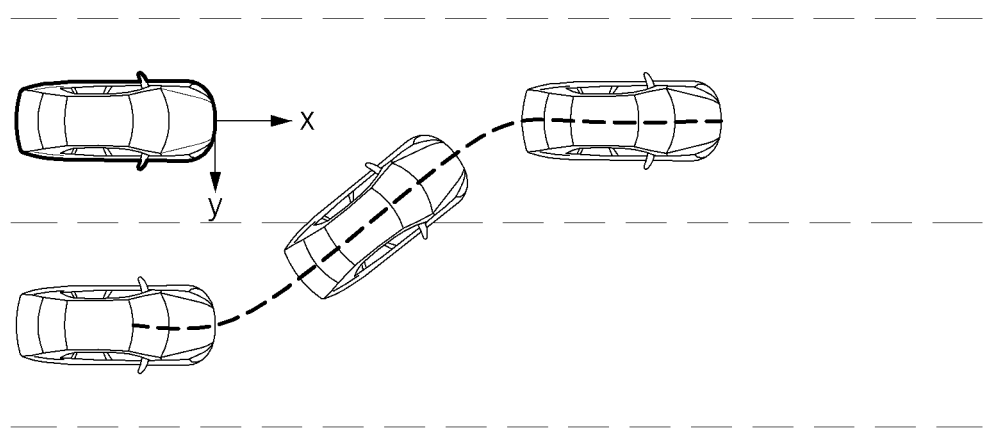
FIGS. 8A and 8B are views illustrating cut-in loci in low speed and in high speed situations, respectively, related to the present disclosure.
Figure 8B:
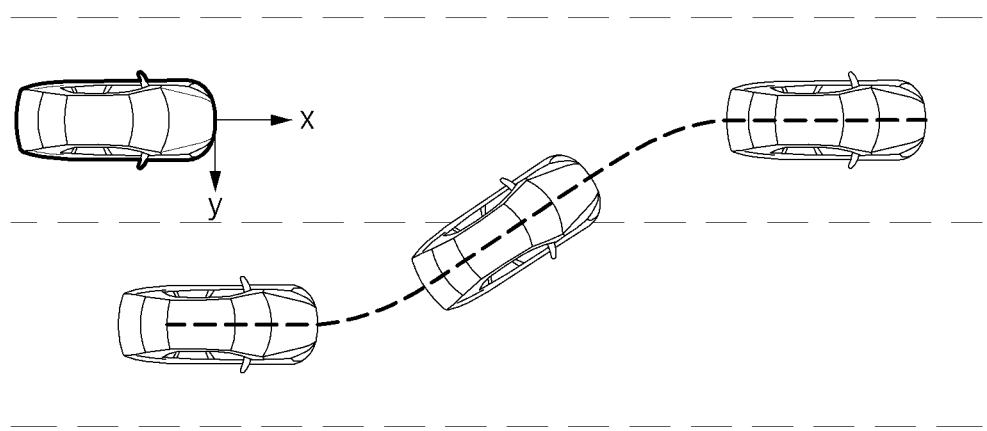
Figure 9:
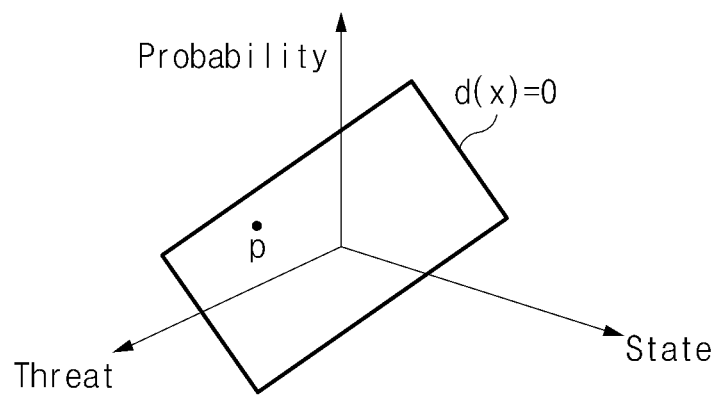
FIG. 9 is a view explaining a reference for calculating and deciding a feature vector related to the present disclosure.

FIG. 1 is a block diagram of a surrounding vehicle maneuver deciding apparatus according to an embodiment of the present disclosure. FIG. 2 is a view explaining a method for deciding the passing of a gate related to the present disclosure. FIG. 3 is a view explaining a warning index calculating method related to the present disclosure. FIG. 4A is a graph depicting a collision threat index in a cut-in situation related to the present disclosure. FIG. 4B is a graph depicting a collision threat index in a driving situation related to the present disclosure. FIG. 5 is a view illustrating an IMM-UKF related to the present disclosure. FIG. is a mode transition state view related to the present disclosure. FIG. 7 is a graph depicting changes of probabilities of a CV model and a CTRV model in a cut-in situation related to the present disclosure. FIGS. 8A and 8B are views illustrating cut-in loci in low speed and in high speed situations related to the present disclosure. FIG. 9 is a view for explaining a reference for calculating and deciding a feature vector related to the present disclosure.

Referring to FIG. 1, the surrounding vehicle maneuver deciding apparatus 100 according to the present disclosure includes a first surrounding vehicle information detector 110, a second surrounding vehicle information detector 120, in-vehicle sensors 130, a storage or memory 140, an output unit 150, and a processor 160.

The first surrounding vehicle information detector 110 detects a surrounding vehicle located around a vehicle through at least one front radar device installed on a front surface of the vehicle. The first surrounding vehicle information detector 110 obtains state information such as a location and a relative speed of the detected surrounding vehicle and transmits the obtained state information to the processor 160.

The second surrounding vehicle information detector 120 detects a surrounding vehicle located around the vehicle through corner radar devices installed at front corners of the vehicle. The second surrounding vehicle information detector 120 obtains state information such as a location and a speed, a width, a length, and a heading angle of the detected surrounding vehicle and transmits the obtained state information to the processor 160.

The in-vehicle sensors 130 obtain (detect) vehicle state information by using various sensors disposed in the vehicle. The in-vehicle sensors 130 include a speed sensor, a yaw rate sensor, a distance sensor, an image sensor, a location sensor, and a steering angle sensor. In this example, the distance sensor may be a LiDAR device, a radar device, an ultrasonic sensor, or the like. The image sensor may be at least one of different types of sensors, such as a charge coupled device (CCD) image sensor, a complementary metal oxide semiconductor (CMOS) image sensor, a charge priming device (CPD) image sensor, and a charge injection device (CID) image sensor. The location sensor is a global positioning system (GPS) receiver. The location sensor may calculate a current location of a vehicle terminal 100 (a location of the vehicle) by using signals transmitted from three or more GPS satellites. Two or more location sensors may be installed.

The storage 140 may store software programmed to perform a specific operation and various pieces of setting information. The storage 140 may temporarily store data generated according to an operation of the processor 160.

The storage or memory 140 may be implemented by one or more of different types of storage media (recording media) such as a flash memory, a hard disk, a secure digital (SD) card, a random access memory (RAM), a read only memory (ROM), an electrically erasable and programmable ROM (EEPROM), an erasable and programmable ROM (EPROM), a register, a detachable disk, and web storage.

The output unit 150 outputs information processed by the processor 160 in a form which the user may recognize in visual, audible, and haptic ways. The output unit 150 may output a driving speed, route guide information, a map, and autonomous driving related information. The output unit 150 may include a display, an audio output module, and a haptic module.

The display unit 310 may include any one of a liquid crystal display (LCD), a thin film transistor-liquid crystal display (TFT-LCD), an organic light-emitting diode (OLED) display, a flexible display, a 3D display, a transparent display, a head-up display (HUD), and a cluster.

The audio output module may output audio data stored in the storage 140. For example, the audio output module may output an audio signal that informs route guide information and an alarm through a speaker. The audio output module may include a receiver, a speaker, and/or a buzzer.

The haptic module outputs a signal in a form which the user may recognize in a haptic way. For example, the haptic module may be a vibrator to control an intensity and a pattern of vibration.

The processor 160 executes software stored in the storage 140. The processor 160 may include at least one of an application specific integrated circuit (ASIC), a digital signal processor (DSP), programmable logic devices (PLDs), field programmable gate arrays (FPGAs), a central processing unit (CPU), microcontrollers, and microprocessors.

The processor 160 includes a tracking unit 161, a motion deciding unit 162, a maneuver deciding unit 163, and a final maneuver deciding unit 164.

The tracking unit 161 receives first surrounding vehicle information and second surrounding vehicle information from the first surrounding vehicle information detector 110 and the second surrounding vehicle information detector 120, respectively. The tracking unit 161 identifies whether the first surrounding vehicle information and the second surrounding vehicle information are information on the same surrounding vehicle. When it is identified that the first surrounding vehicle information and the second surrounding vehicle information are information on the same surrounding vehicle, the tracking unit 161 fuses the first surrounding vehicle information and the second surrounding vehicle information. In other words, when a first surrounding vehicle detected through a front radar device and a second surrounding vehicle detected through a corner radar device are the same vehicle, the information obtained through the front radar device and the information obtained through the corner radar device are fused by the tracking unit 161.

In this example, in order to identify whether the first surrounding vehicle information and the second surrounding vehicle information are the information on the same surrounding vehicle, the tracking unit 161 decides the passing of a gate based on the first surrounding vehicle information and the second surrounding vehicle information. Then, as shown in FIG. 2, the tracking unit 161 sets a rectangular gate G based on a location of the first surrounding vehicle $O_{front}$ detected by the front radar device. The gate refers to a rectangular area (range), the center of which is a location of the surrounding vehicle detected by the front radar device. When the second surrounding vehicle $O_{corner}$ detected by the corner radar device is located within the set gate G, the tracking unit 161 fuses the first surrounding vehicle information and the second surrounding vehicle information. When the second surrounding vehicle is not located within the set gate G, the tracking unit 161 registers the second surrounding vehicle information in the storage 140 as new information on the surrounding vehicle.

The tracking unit 161 identifies whether a distance between the first surrounding vehicle and the second surrounding vehicle is less than a reference distance. The tracking unit 161 decides the passing of the gate when the distance between the first surrounding vehicle and the second surrounding vehicle is less than the reference distance. When the first surrounding vehicle is stopped but the second surrounding vehicle moves after the passing of the gate, the processor 160 deletes the second surrounding vehicle information from the fused surrounding vehicle information.

The motion deciding unit 162 decides a motion $i_{motion}$ of a surrounding vehicle by using the first surrounding vehicle information, the second surrounding vehicle information, and the information measured through the in-vehicle sensors 130. The processor 160 calculates a speed $V_{B,t}$ of a surrounding vehicle by using Equation 1.

$$V_{B,t} = V_A + (\dot{x}_{r,i} + y_{r,i}\omega) \quad \text{[Equation 1]}$$

In this example, $V_A$ is a vehicle speed measured by the in-vehicle sensors of a host vehicle, $x_{r,i}$ is a relative longitudinal speed of an i-th surrounding vehicle detected by a radar device r, $y_{r,i}$ is a relative transverse location of the i-th surrounding vehicle detected by a radar device r, and w is a yaw rate of the host vehicle. The yaw rate w of the host vehicle satisfies Equation 2.

$$\omega = \begin{cases} 0 & \text{if } |\dot{\psi}| \leq \varepsilon_1 \\ \dot{\psi} & \text{otherwise} \end{cases} \quad \text{[Equation 2]}$$

In this example, $\dot{\psi}$ is a yaw rate measured by the in-vehicle sensors 130 of the host vehicle. The character $\varepsilon_1$ is a critical yaw rate and is a constant value determined in advance.

The motion deciding unit 162 decides a motion of the surrounding vehicle according to the calculated speed $V_{B,t}$ of the surrounding vehicle. The motion deciding unit 162 determines that the surrounding vehicle is stationary when the calculated speed $V_{B,t}$ of the surrounding vehicle is not more than a critical speed. The motion deciding unit 162 determines that the surrounding vehicle is dynamic when the calculated speed $V_{B,t}$ of the surrounding vehicle is more than the critical speed.

The maneuver deciding unit 163 receives state information of the surrounding vehicle from the tracking unit 161. The maneuver deciding unit 163 decides a maneuver of the surrounding vehicle by using a maneuver decision logic derived by a machine training technique based on the received state information of the surrounding vehicle. In this example, a support vector machine (SVM) may be used for the machine training technique. The maneuver decision logic may be a classification logic (a classification algorithm or a classifier) obtained by synthesizing a state-based maneuver decision logic, a threat-based maneuver decision logic, and a probability-based maneuver decision logic through the SVM.

The state-based maneuver decision logic is an algorithm for deciding a maneuver of the surrounding vehicle based on the state information of the tracked surrounding vehicle output from the tracking unit 161. The state-based maneuver decision logic decides a maneuver according to whether the state information exceeds a threshold because magnitudes and changes of a transverse location y and a relative transverse speed $V_y$ are large not in a short-distance range but in a general cut-in situation in a low speed (e.g., 30 kph (approximately 18 mph) or less).

For example, when the transverse location y of the surrounding vehicle is less than a first threshold and the relative transverse speed $V_y$ of the surrounding vehicle is less than a second threshold, the state-based maneuver decision logic decides that the surrounding vehicle cuts in from the right side of the host vehicle. For example, when the transverse location y of the surrounding vehicle is more than a third threshold and the relative transverse speed $V_y$ of the surrounding vehicle is more than a fourth threshold, the state-based maneuver decision logic decides that the surrounding vehicle cuts in from the left side of the host vehicle.

The threat-based maneuver decision logic is an algorithm for deciding a maneuver of the surrounding vehicle by identifying a threat of collision of the host vehicle and the surrounding vehicle. The threat-based maneuver decision logic calculates a time-to-collision by using Equation 3.

$$TTC = \frac{x}{v_{rel}} \quad \text{[Equation 3]}$$

In this example, x is a distance between the host vehicle and the surrounding vehicle and $v_{rel}$ is a relative speed of the surrounding vehicle.

The threat-based maneuver decision logic calculates a warning index $x_p$ by using Equation 4.

$$x_p = \frac{p_{long} - d_{br}}{d_w - d_{br}} \quad \text{[Equation 4]}$$

In this example, $p_{long}$ is a distance between two vehicles as illustrated in FIG. 3. The character $d_{br}$ is a braking-critical distance considering only a braking performance of the vehicle and is represented in Equation 5. The character $d_w$ is a warning-critical distance considering a braking performance of the vehicle and a reaction speed of the user and is represented in Equation 6.

$$d_{br} = v_{rel} \cdot t_{brake} - \frac{v_{rel}^2}{2a_{x,max}} \quad \text{[Equation 5]}$$

$$d_w = v_{rel} \cdot t_{thinking} + v_{rel} \cdot t_{brake} - \frac{v_{rel}^2}{2a_{x,max}} \quad \text{[Equation 6]}$$

In this example, $v_{rel}$ is a relative longitudinal speed of the vehicle, $t_{brake}$ is a system delay time of braking system hardware, $a_{x,max}$ is a maximum longitudinal deceleration of the vehicle, and $t_{thinking}$ is a reaction time of the user.

When the host vehicle and the surrounding vehicle maximally decelerate after starting from a warning-critical distance $d_w$, the vehicles stop when the bumpers of the two vehicles contact each other. When a distance x between the host vehicle and the surrounding vehicle exceeds $d_w$, it means that a warning index is a positive value and a current situation is safe.

The threat-based maneuver decision logic calculates a longitudinal collision risk index $I_{long}$ by using Equation 7.

$$I_{long} = \max\left(\frac{|x_{max} - x_p|}{|x_{max} - x_{th}|}, \frac{|TTC^{-1}|}{|TTC_{th}^{-1}|}\right) \quad \text{[Equation 7]}$$

his example, $x_{max}$ is a maximum value of the warning index, $x_{th}$ is a threshold value of the warning index, and $TTC_{th}^{-1}$ is a threshold value of $TTC^{-1}$.

In a situation in which the vehicle travels at 50 kph (approximately 31 mph), the vehicle decelerates at a maximum gravitational acceleration when TTC is 0.6 to 0.7 seconds. In a low speed situation of 10 kph (approximately 6 mph) or less, the threshold value $TTC_{th}$ is set to 3.

The maximum value $x_{max}$ of the warning index is a tuning parameter. The index $I_{long}$ becomes dull to the change of the index when the maximum value $x_{max}$ of the warning index is set to an excessively large value (e.g., 8). Further, $I_{long}$ is apt to be larger as the maximum value $x_{max}$ of the warning index becomes larger.

The threat-based maneuver decision logic calculates a lateral collision risk index $I_{lat}$ (K. Kim, "Predicted potential risk-based vehicle motion control of automated vehicles for integrated risk management," Doctoral Dissertation, Seoul National University Graduate, 2016.).

The threat-based maneuver decision logic calculates a time-to-lane crossing (TLC) through Equation 8.

$$TLC = \frac{y}{v_y} \quad \text{[Equation 8]}$$

In this example, y is a transverse location of the surrounding vehicle and $v_y$ is a relative transverse speed of the surrounding vehicle.

The threat-based maneuver decision logic calculates a transverse collision risk index $I_{lat}$ by using a lane change time. The transverse collision risk index $I_{lat}$ may be represented as in Equation 9.

$$I_{lat} = \min(I_{long,p}, 1) \cdot \min\left(\frac{TLC_{th}}{TLC}, 1\right) \quad \text{[Equation 9]}$$

In this example, a transverse collision risk index $I_{lat}$ has a value between 0 and 1, and a current situation is dangerous as it approaches 1. In order to decide a short-distance cut-in having a large transverse motion influence in a low speed situation of 10 kph (approximately 6 mph) or lower, a threshold value (critical value) $TLC_{th}$ (e.g., 1.5) is set to be low more conservatively than $TTC_{th}$.

Although a transverse collision risk index increases up to 1 in a cut-in situation as illustrated in FIG. 4A, it can be seen that the transverse collision risk index is maintained at a relatively low value in a driving situation as illustrated in FIG. 4B.

When a cut-in maneuver of a surrounding vehicle located at a short distance from a host vehicle is decided at a low speed situation, the transverse speed of the surrounding vehicle (cut-in vehicle) is low not to exceed a threshold value in the low speed situation. Additionally, the decision of the cut-in maneuver of the surrounding vehicle may fail when the transverse location of the surrounding vehicle is close to the threshold value at the short distance. Since a threat, based on a form of a location of which is divided by a relative speed, may be calculated to be high, even though a transverse location and a transverse speed are small, in a low speed/short distance situation.

The probability-based maneuver decision logic decides a maneuver of a surrounding vehicle by using Interacting Multiple Model Unscented Kalman Filter (IMM-UKF) (Branko Ristic, Sanjeev Arulampalam, and Neil Gordon. "Beyond the Kalman filter;" IEEE Aerospace and Electronic Systems Magazine 19.7 (2004): 37-38.) using a corner radar device and a free space.

Figure 6:
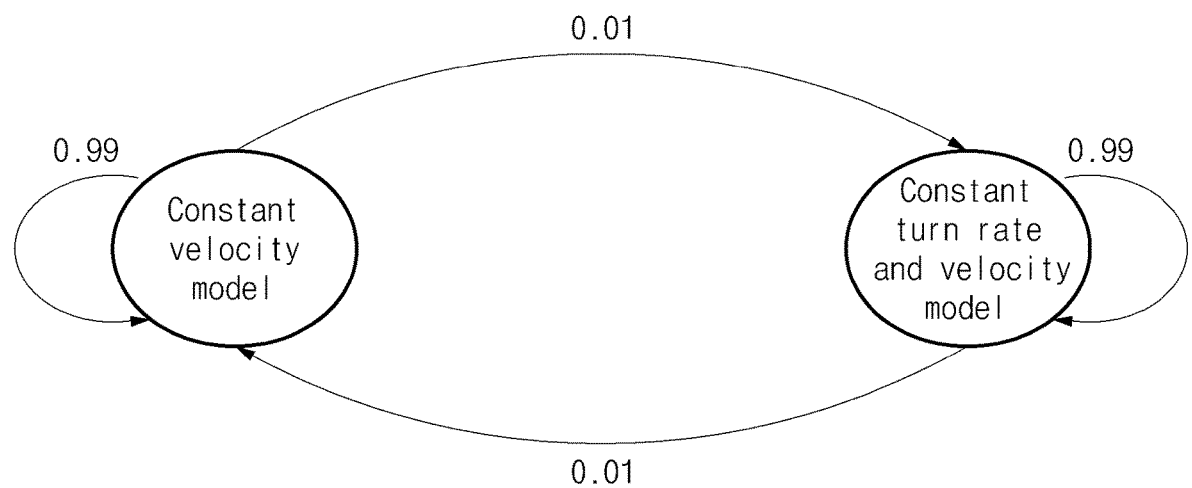
FIG. 6 is a mode transition state view related to the present disclosure.

The probability-based maneuver decision logic stochastically calculates a model of a vehicle to decide a maneuver of a surrounding vehicle (target vehicle). The probability-based maneuver decision logic calculates probabilities for a constant velocity (CV) model and a constant turn rate and velocity (CTRV) model by using an IMM-KF architecture illustrated in FIG. 5. The probability-based maneuver decision logic transits a mode according to a mode transition state degree illustrated in FIG. 6.

Because a motion is changed from a linear motion to a rotation when a vehicle cuts in, the probability of the CV model becomes lower and the probability of the CTRV model becomes higher as illustrated in FIG. 7. Accordingly, the probability-based maneuver decision logic may decide that the surrounding vehicle has a cut-in maneuver when the probability for the CTRV model becomes higher than the probability for the CV model.

When the surrounding vehicle cuts in at a low speed of FIG. 8A, a large rotation is generated as compared with a general cut-in situation of FIG. 8B. A cut-in maneuver of the surrounding vehicle may be decided by using a phenomenon in which the probability of the CTRV model increases as the vehicle rotates at a low speed when IMM-UKF that uses a model (CTRV model) representing a rotation and a model (CV model) representing a linear motion is employed.

As described above, the maneuver deciding method includes an algorithm that uses state information (a location and a relative speed) of a surrounding vehicle, an algorithm that uses a threat, and an algorithm that uses a change of the probability of a vehicle model. A method for deciding a maneuver by using any one algorithm among them deteriorates performance according to a situation. Further, in the same situation, the performance of one algorithm may deteriorate but the performance of another algorithm may increase. Accordingly, the present disclosure increases maneuver decision performance by synthesizing several maneuver-deciding algorithms through a support vector machine (SVM) to build a robust synthetic algorithm (maneuver decision logic).

The maneuver deciding unit 163 decides a maneuver of a surrounding vehicle based on new surrounding vehicle information input from the first surrounding vehicle information detector 110 and the second surrounding vehicle information detector 120 according to the maneuver decision logic derived by the SVM.

When the surrounding vehicle information is input, the maneuver deciding unit 163 calculates a state value, a threat, and a probability (a CTRV model probability) of the surrounding vehicle by utilizing the state-based maneuver decision logic, the threat-based maneuver decision logic, and the probability-based maneuver decision logic. Further, the maneuver deciding unit 163 calculates a 3-dimensional feature vector p (=[state threat probability]T) for the surrounding vehicle based on a state, a threat, and a probability of the surrounding vehicle as illustrated in FIG. 9.

The maneuver deciding unit 163 decides a maneuver of the surrounding vehicle based on a distance between the feature vector (feature point) and a hyper-plane d(x). In this example, the super-plane d(x) is a decision reference for deciding whether the surrounding vehicle cuts in by using a feature vector p. The super-plane d(x) may be represented as in Equation 10 (see FIG. 9).

$$d(x) = c^T p - d = 0 \quad \text{[Equation 10]}$$

In this example, $c^T$ is a weight vector and d is a bias.

The maneuver deciding unit 163 decides that there is a cut-in maneuver of the surrounding vehicle when $c^T p - d$ is larger than 0. The maneuver deciding unit 163 decides that there is a driving maneuver of the surrounding vehicle when $c^T p - d$ is smaller than 0. In other words, the maneuver deciding unit 163 decides whether there is a cut-in maneuver of the surrounding vehicle according to whether a result value obtained by inserting the mapped feature vector p of the surrounding vehicle into d(x) is a negative value or a positive value based on new surrounding vehicle information.

The final maneuver deciding unit 164 finally decides a maneuver of the surrounding vehicle based on a motion deciding result output from the motion deciding unit 162 and the maneuver deciding unit 163. Additionally, the final maneuver deciding unit 164 finally decides a maneuver of the surrounding vehicle based on a decision result by the maneuver decision logic derived by the SVM.

The final maneuver deciding unit 164 decides the current maneuver of the surrounding vehicle as a cut-in when the motion of the surrounding vehicle is dynamic, the previous maneuver of the surrounding vehicle is not a cut-in, and $c^T p - d$ is larger than 0 according to the maneuver decision logic. The final maneuver deciding unit 164 decides the current maneuver of the surrounding vehicle as driving when the motion of the surrounding vehicle is dynamic, the previous maneuver of the surrounding vehicle is not a cut-in, and $c^T p - d$ is smaller than 0 according to the maneuver decision logic.

The final maneuver deciding unit 164 decides the current maneuver of the surrounding vehicle as a cut-in when the motion of the surrounding vehicle is stationary and the previous maneuver of the surrounding vehicle is a cut-in.

The final maneuver deciding unit 164 decides the current maneuver of the surrounding vehicle as a stop when the motion of the surrounding vehicle is stationary and the previous maneuver of the surrounding vehicle is not a cut-in.

The final maneuver deciding unit 164 decides the current maneuver of the surrounding vehicle as a cut-in when the motion of the surrounding vehicle is dynamic, the previous maneuver of the surrounding vehicle is a cut-in, and a distance between the host vehicle and the surrounding vehicle is less than a reference distance. The final maneuver deciding unit 164 decides the current maneuver of the surrounding vehicle as being dynamic when the motion of the surrounding vehicle is dynamic, the previous maneuver of the surrounding vehicle is a cut-in, and a distance between the host vehicle and the surrounding vehicle is larger than a reference distance.

Figure 10:
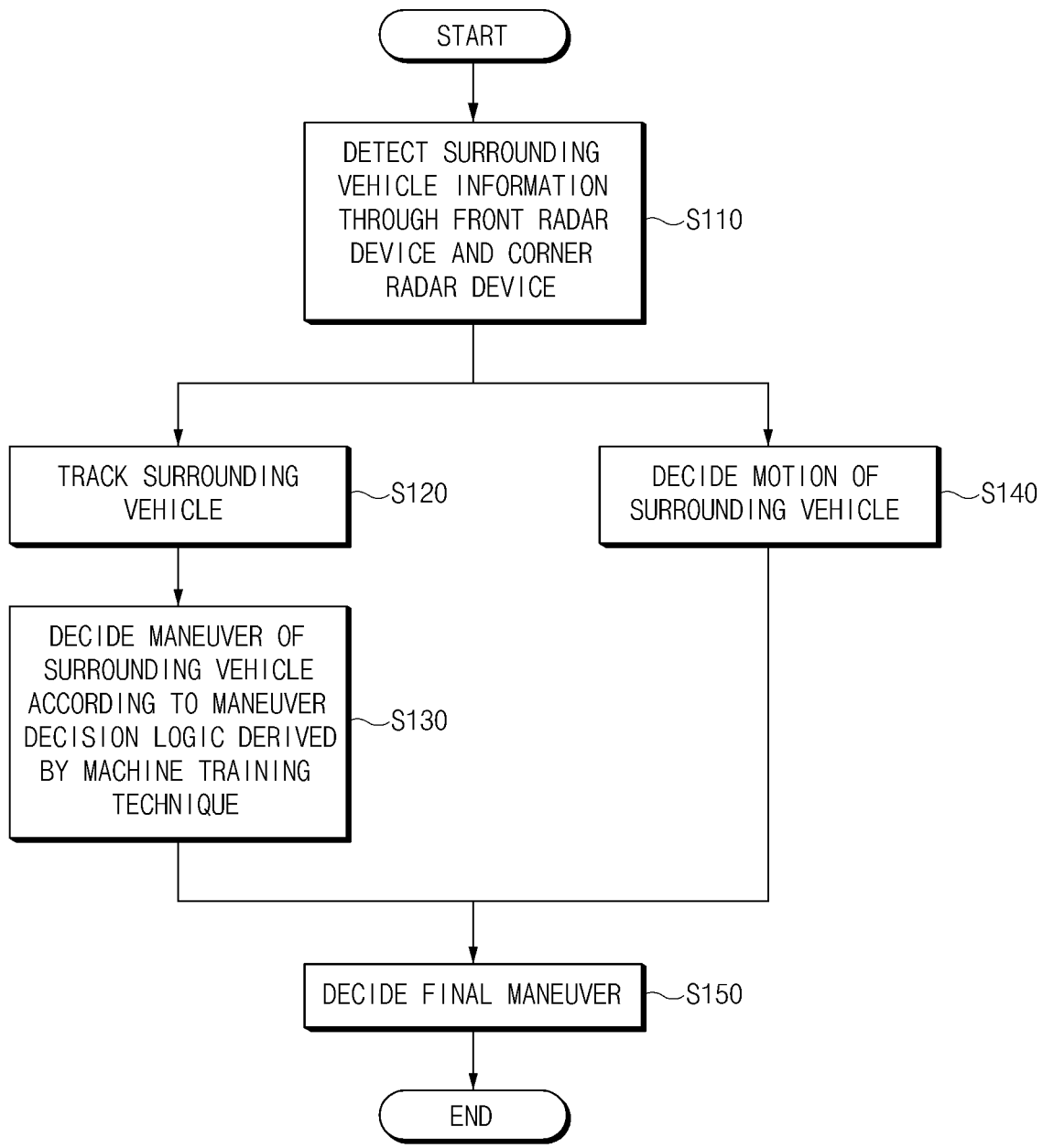
FIG. 10 is a flowchart of a surrounding vehicle maneuver deciding method according to an embodiment of the present disclosure.
Figure 11:
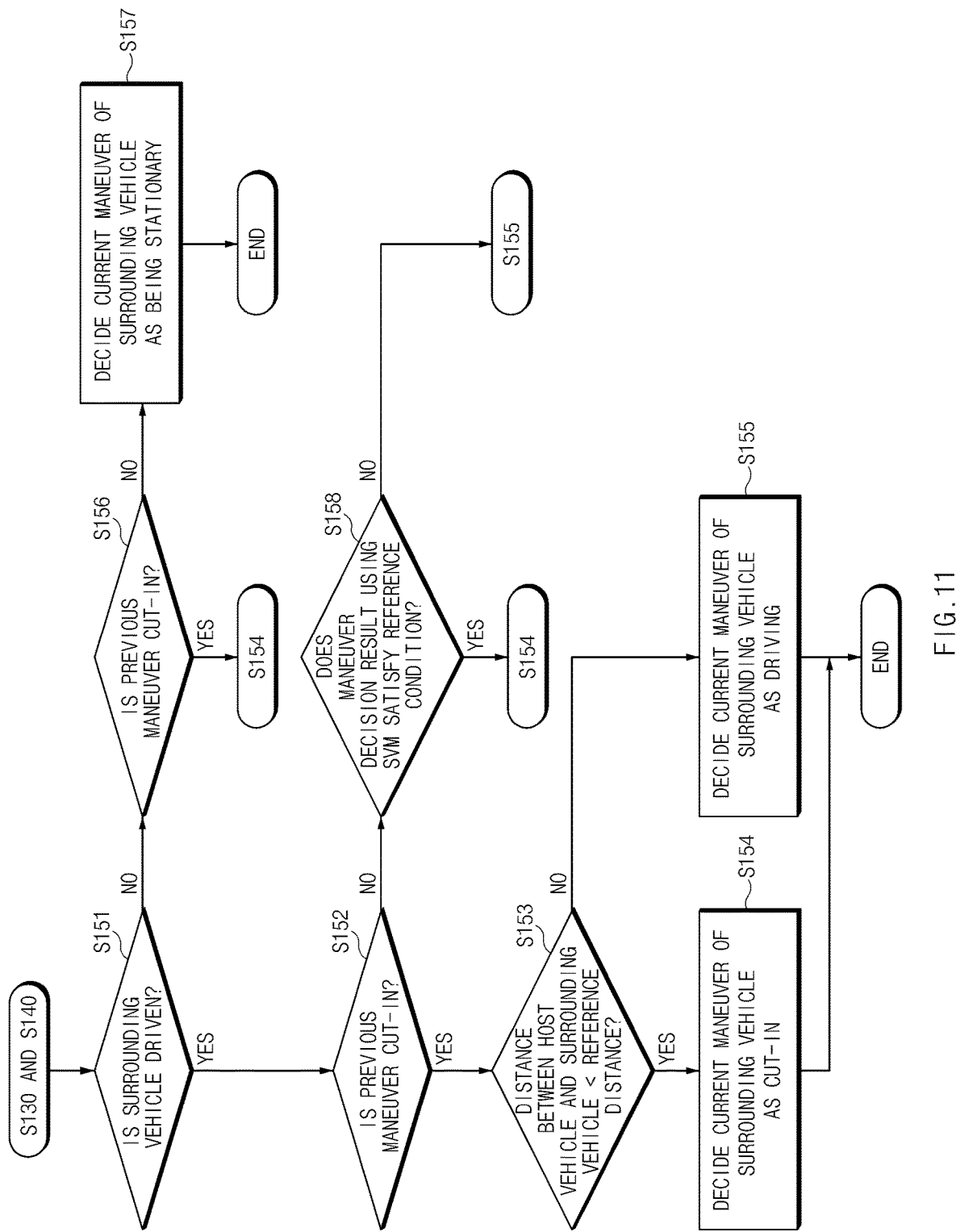
FIG. 11 is a flowchart illustrating a final maneuver deciding process of FIG. 10 according to an embodiment of the present disclosure.

FIG. 10 is a flowchart of a surrounding vehicle maneuver deciding method according to an embodiment of the present disclosure. FIG. 11 is a flowchart illustrating a final maneuver deciding process of FIG. 10.

Referring to FIG. 10, the processor 160 detects the surrounding vehicle information through a front radar device and a corner radar device (S110). The first surrounding vehicle information detector 110 detects the first surrounding vehicle information for the first surrounding vehicle detected through the front radar device and transmits the detected first surrounding vehicle information to the processor 160. The second surrounding vehicle information detector 120 detects the second surrounding vehicle information for the second surrounding vehicle detected through the corner radar device and transmits the detected second surrounding vehicle information to the processor 160.

The processor 160 tracks a surrounding vehicle by using the surrounding vehicle information (S120). The processor 160 sets a rectangular gate based on a location of the first surrounding vehicle according to the first surrounding vehicle information and the second surrounding vehicle information. Additionally, the processor 160 identifies whether the second surrounding vehicle is located within the corresponding gate. The processor 160 calculates a distance between the first surrounding vehicle and the second surrounding vehicle when the second surrounding vehicle is located in the corresponding gate. The processor 160 also decides that the first surrounding vehicle and the second surrounding vehicle are the same surrounding vehicle when the corresponding distance is a reference distance or less. The processor 160 then fuses the first surrounding vehicle information and the second surrounding vehicle information. In other words, the processor 160 tracks a target surrounding vehicle by using the first surrounding vehicle information and the second surrounding vehicle information.

The processor 160 decides a maneuver of the corresponding surrounding vehicle by using the maneuver decision logic derived by a machine training technique based on the state information (coupled surrounding vehicle information) of the tracked surrounding vehicle (S130). The processor 160 decides a maneuver of the surrounding vehicle by using a synthetic algorithm (maneuver decision logic) obtained by synthesizing a state-based maneuver deciding algorithm, a maneuver deciding algorithm using a threat, and a probability-based maneuver deciding algorithm by using the SVM.

The processor 160 calculates a state of the surrounding vehicle based on the state information (a transverse location and a transverse relative speed) of the surrounding vehicle by utilizing the state-based maneuver deciding algorithm. The processor 160 calculates a collision threat for the surrounding vehicle based on the state information of the surrounding vehicle by using a maneuver deciding algorithm using a threat. Further, the processor 160 calculates a probability (of rotation) of the CTRV model from the state information of the surrounding vehicle by utilizing the probability-based maneuver deciding algorithm. The processor 160 calculates a feature vector of the surrounding vehicle based on a state, a threat, and a probability. The processor 160 decides whether there is a cut-in maneuver of the surrounding vehicle by evaluating the calculated feature vector as a maneuver deciding reference (super-plane).

The processor 160 decides a motion of the surrounding vehicle by using the surrounding vehicle information (S140). The processor 160 decides that a motion of the surrounding vehicle is stationary or dynamic based on the speed of the surrounding vehicle.

The processor 160 finally decides a maneuver of the surrounding vehicle based on the decision result by the maneuver decision logic and the motion decision result of the surrounding vehicle (S150).

Hereinafter, a process of deciding a final maneuver of a surrounding vehicle is described in detail with reference to FIG. 11.

The processor 160 identifies whether the motion of the surrounding vehicle is dynamic (S151). When the motion of the surrounding vehicle is dynamic, the processor 160 identifies whether the previous maneuver of the surrounding vehicle is a cut-in (S152). When the previous maneuver of the surrounding vehicle is a cut-in, the processor 160 identifies whether a distance between the host vehicle and the surrounding vehicle is less than a reference distance (S153). When the distance between the host vehicle and the surrounding vehicle is less than the reference distance, the processor 160 decides that the current maneuver of the surrounding vehicle (target vehicle) is a cut-in (S154).

When the distance between the host vehicle and the surrounding vehicle is not less than the reference distance in S153, the processor 160 decides the current maneuver of the surrounding vehicle as driving (S155).

When the previous maneuver decision result is not a cut-in in S152, the processor 160 identifies whether the maneuver decision result by the maneuver decision logic satisfies a reference condition (S158). In other words, the processor 160 identifies whether $c^T p - d$ exceeds 0 in the maneuver decision result by the maneuver decision logic. When the maneuver decision result by the maneuver decision logic satisfies a reference condition, the processor 160 decides that the current maneuver of the surrounding vehicle is a cut-in (S154). That is, when $c^T p - d$ exceeds 0 in the maneuver decision result by the maneuver decision logic, the processor 160 decides that the current maneuver of the surrounding vehicle is a cut-in.

When the maneuver decision result by the maneuver decision logic fails to satisfy the reference condition, the processor 160 decides that the current maneuver of the surrounding vehicle is driving (S155). That is, when $c^T p - d$ is not more than 0 in the maneuver decision result by the maneuver decision logic, the processor 160 decides that the current maneuver of the surrounding vehicle is driving.

When the motion decision result of the surrounding vehicle is not driving in S151, the processor 160 identifies whether the previous maneuver decision result of the surrounding vehicle is a cut-in (S156). In other words, when the motion of the surrounding vehicle is stationary, the processor 160 identifies whether the previous maneuver of the surrounding vehicle is a cut-in. When the previous maneuver decision result is a cut-in, the processor 160 decides that the current maneuver of the surrounding vehicle is a cut-in (S154). When the previous maneuver decision result is not a cut-in in S156, the processor 160 decides that the current maneuver of the target vehicle is stationary (S157).

The present disclosure may decide a cut-in maneuver of a surrounding vehicle by synthesizing an existing maneuver decision algorithm and a threat decision algorithm by using a machine training technique.

Further, the present disclosure may improve the maneuver decision performance by deciding a maneuver of a surrounding vehicle by using sensor fusion information and a maneuver decision algorithm as well as surrounding vehicle information detected by multiple sensors.

What is claimed is:

1. An apparatus for deciding a maneuver of a surrounding vehicle, the apparatus comprising:
    a first surrounding vehicle information detector configured to obtain first surrounding vehicle information for a first surrounding vehicle relative to a vehicle-by using a front radar device;
    a second surrounding vehicle information detector configured to obtain second surrounding vehicle information for a second surrounding vehicle by using a corner radar device; and
    a processor configured to set a gate based on a location of the first surrounding vehicle, identify whether the second surrounding vehicle is located within the set gate, fuse the first surrounding vehicle information and the second surrounding vehicle information when the second surrounding vehicle is located within the set gate, decide a motion of the surrounding vehicle by using the first surrounding vehicle information and the second surrounding vehicle information, decide a maneuver of the surrounding vehicle by using maneuver decision logic derived by a machine training technique based on the fused surrounding vehicle information, and decide a final maneuver of the surrounding vehicle by using the two decision results.

2. The apparatus of claim 1, wherein a support vector machine (SVM) is used for the machine training technique.

3. The apparatus of claim 1, wherein the processor identifies whether the first surrounding vehicle detected by the front radar device and the second surrounding vehicle detected by the corner radar device are the same vehicle by using the first surrounding vehicle information and the second surrounding vehicle information.

4. The apparatus of claim 3, wherein the processor fuses the first surrounding vehicle information and the second surrounding vehicle information when the first surrounding vehicle detected by the front radar device and the second surrounding vehicle detected by the corner radar device are the same vehicle.

5. The apparatus of claim 1, wherein the processor decides that a current maneuver of the surrounding vehicle is a cut-in when a motion of the surrounding vehicle is dynamic, a previous maneuver of the surrounding vehicle is not a cut-in, and a decision result by the maneuver decision logic satisfies a reference condition.

6. The apparatus of claim 1, wherein the processor decides that a current maneuver of the surrounding vehicle is driving when a motion of the surrounding vehicle is dynamic, a previous maneuver of the surrounding vehicle is not a cut-in, and a decision result by the maneuver decision logic fails to satisfy a reference condition.

7. The apparatus of claim 1, wherein the processor decides that a current maneuver of the surrounding vehicle is a cut-in when a motion of the surrounding vehicle is stationary and a previous maneuver of the surrounding vehicle is a cut-in.

8. The apparatus of claim 1, wherein the processor decides that a current maneuver of the surrounding vehicle is a stop when a motion of the surrounding vehicle is stationary and a previous maneuver of the surrounding vehicle is not a cut-in.

9. The apparatus of claim 1, wherein the processor decides that a current maneuver of the surrounding vehicle is a cut-in when a motion of the surrounding vehicle is dynamic, a previous maneuver of the surrounding vehicle is a cut-in, and a distance between the vehicle and the surrounding vehicle is less than a reference value.

10. The apparatus of claim 1, wherein the processor decides that a current maneuver of the surrounding vehicle is driving when a motion of the surrounding vehicle is dynamic, a previous maneuver of the surrounding vehicle is a cut-in, and a distance between the vehicle and the surrounding vehicle is more than a reference value.

11. A method for deciding a maneuver of a surrounding vehicle, the method comprising:
    obtaining first surrounding vehicle information for a first surrounding vehicle relative to a vehicle by using a front radar device and second surrounding vehicle information for a second surrounding vehicle by using a corner radar device;
    setting a gate based on a location of the first surrounding vehicle;
    identifying whether the second surrounding vehicle is located within the set gate;
    fusing the first surrounding vehicle information and the second surrounding vehicle information when the second surrounding vehicle is located within the set gate;
    deciding a maneuver of the surrounding vehicle according to maneuver decision logic derived by a machine training technique by using the fused surrounding vehicle information;
    deciding a motion of the surrounding vehicle by using the surrounding vehicle information; and
    deciding a final maneuver of the surrounding vehicle based on a motion decision result of the surrounding vehicle and a maneuver decision result by the maneuver decision logic.

12. The method of claim 11, wherein the obtaining of the surrounding vehicle information includes:
    identifying whether the first surrounding vehicle detected by the front radar device and the second surrounding vehicle detected by the corner radar device are the same vehicle by using the first surrounding vehicle information and the second surrounding vehicle information.

13. The method of claim 12, wherein the obtaining of the surrounding vehicle information includes:
    generating the surrounding vehicle information by fusing the first surrounding vehicle information and the second surrounding vehicle information when the first surrounding vehicle detected by the front radar device and the second surrounding vehicle detected by the corner radar device are the same vehicle.

14. The method of claim 11, wherein a support vector machine (SVM) is used for the machine training technique.

15. The method of claim 11, wherein the deciding of the final maneuver of the surrounding vehicle includes:
    deciding that a current maneuver of the surrounding vehicle is a cut-in when a motion of the surrounding vehicle is dynamic, a previous maneuver of the surrounding vehicle is not a cut-in, and a decision result by the maneuver decision logic satisfies a reference condition.

16. The method of claim 11, wherein the deciding of the final maneuver of the surrounding vehicle includes:
    deciding that a current maneuver of the surrounding vehicle is driving when a motion of the surrounding vehicle is dynamic, a previous maneuver of the surrounding vehicle is not a cut-in, and a decision result by the maneuver decision logic fails to satisfy a reference condition.

17. The method of claim 11, wherein the deciding of the final maneuver of the surrounding vehicle includes:
    deciding that a current maneuver of the surrounding vehicle is a cut-in when a motion of the surrounding vehicle is stationary and a previous maneuver of the surrounding vehicle is a cut-in.

18. The method of claim 11, wherein the deciding of the final maneuver of the surrounding vehicle includes:
    deciding that a current maneuver of the surrounding vehicle is a stop when a motion of the surrounding vehicle is stationary and a previous maneuver of the surrounding vehicle is not a cut-in.

19. The method of claim 11, wherein the deciding of the final maneuver of the surrounding vehicle includes:
    deciding that a current maneuver of the surrounding vehicle is a cut-in when a motion of the surrounding vehicle is dynamic, a previous maneuver of the surrounding vehicle is a cut-in, and a distance between the vehicle and the surrounding vehicle is less than a reference value.

20. The method of claim 11, wherein the deciding of the final maneuver of the surrounding vehicle includes:
    deciding that a current maneuver of the surrounding vehicle is driving when a motion of the surrounding vehicle is dynamic, a previous maneuver of the surrounding vehicle is a cut-in, and a distance between the vehicle and the surrounding vehicle is more than a reference value.

* * * * *